United States Patent
Fallone et al.

(10) Patent No.: US 8,443,167 B1
(45) Date of Patent: May 14, 2013

(54) DATA STORAGE DEVICE EMPLOYING A RUN-LENGTH MAPPING TABLE AND A SINGLE ADDRESS MAPPING TABLE

(75) Inventors: Robert M. Fallone, Laguna Niguel, CA (US); William B. Boyle, Lake Forest, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 639 days.

(21) Appl. No.: 12/639,794

(22) Filed: Dec. 16, 2009

(51) Int. Cl.
*G06F 12/10* (2006.01)

(52) U.S. Cl.
USPC .......................................... 711/206; 711/209

(58) Field of Classification Search ........................ None
See application file for complete search history.

(56) References Cited

U.S. PATENT DOCUMENTS

| | | | |
|---|---|---|---|
| 4,769,770 A | 9/1988 | Miyadera et al. | |
| 5,613,066 A | 3/1997 | Matsushima et al. | |
| 6,092,231 A | 7/2000 | Sze | |
| 6,202,121 B1 | 3/2001 | Walsh et al. | |
| 6,324,604 B1 | 11/2001 | Don et al. | |
| 6,339,811 B1 | 1/2002 | Gaertner et al. | |
| 6,574,774 B1 | 6/2003 | Vasiliev | |
| 6,772,274 B1 | 8/2004 | Estakhri | |
| 6,829,688 B2 | 12/2004 | Grubbs et al. | |
| 6,886,068 B2 | 4/2005 | Tomita | |
| 6,895,468 B2 | 5/2005 | Rege et al. | |
| 6,901,479 B2 | 5/2005 | Tomita | |
| 6,920,455 B1 | 7/2005 | Weschler | |
| 6,967,810 B2 | 11/2005 | Kasiraj et al. | |
| 7,155,448 B2 | 12/2006 | Winter | |
| 7,412,585 B2 | 8/2008 | Uemura | |
| 7,486,460 B2 | 2/2009 | Tsuchinaga et al. | |
| 7,490,212 B2 | 2/2009 | Kasiraj et al. | |
| 7,509,471 B2 | 3/2009 | Gorobets | |
| 7,516,267 B2 | 4/2009 | Coulson et al. | |
| 7,529,880 B2 | 5/2009 | Chung et al. | |
| 7,539,924 B1 | 5/2009 | Vasquez et al. | |
| 7,603,530 B1 | 10/2009 | Liikanen et al. | |
| 7,647,544 B1 | 1/2010 | Masiewicz | |
| 7,669,044 B2 | 2/2010 | Fitzgerald et al. | |
| 7,685,360 B1 | 3/2010 | Brunnett et al. | |
| 7,840,878 B1 | 11/2010 | Tang et al. | |
| 8,006,027 B1 | 8/2011 | Stevens et al. | |
| 8,194,340 B1 | 6/2012 | Boyle et al. | |
| 8,194,341 B1 | 6/2012 | Boyle | |

(Continued)

FOREIGN PATENT DOCUMENTS

WO    2009/102425    8/2009

OTHER PUBLICATIONS

Rosenblum, Mendel and Ousterhout, John K. (Feb. 1992), "The Design and Implementation of a Log-Structured File System", ACM Transactions on Computer Systems, vol. 10, Issue 1, pp. 26-52.

(Continued)

*Primary Examiner* — Gary Portka

(57) ABSTRACT

A data storage device is disclosed comprising a non-volatile memory comprising a plurality of memory segments. When a write command comprising a logical block address (LBA) is received, a number of consecutive memory segments to access in response to the write command is determined. When the number of consecutive memory segments to access is greater than a threshold, a new run-length mapping entry in a run-length mapping table (RLMT) is created. When the number of memory segments to access is not greater than a threshold, at least one new single address mapping entry in a single address mapping table (SAMT) is created.

24 Claims, 8 Drawing Sheets

U.S. PATENT DOCUMENTS

| | | |
|---|---|---|
| 2004/0019718 A1 | 1/2004 | Schauer et al. |
| 2004/0109376 A1 | 6/2004 | Lin |
| 2005/0071537 A1 | 3/2005 | New et al. |
| 2005/0144517 A1 | 6/2005 | Zayas |
| 2006/0090030 A1 | 4/2006 | Ijdens et al. |
| 2006/0112138 A1 | 5/2006 | Fenske et al. |
| 2006/0117161 A1 | 6/2006 | Venturi |
| 2006/0181993 A1 | 8/2006 | Blacquiere et al. |
| 2007/0016721 A1 | 1/2007 | Gay |
| 2007/0067603 A1 | 3/2007 | Yamamoto et al. |
| 2007/0204100 A1 | 8/2007 | Shin et al. |
| 2007/0226394 A1 | 9/2007 | Noble |
| 2007/0245064 A1 | 10/2007 | Liu |
| 2007/0288686 A1 | 12/2007 | Arcedera et al. |
| 2007/0294589 A1 | 12/2007 | Jarvis et al. |
| 2008/0098195 A1 | 4/2008 | Cheon et al. |
| 2008/0104308 A1 | 5/2008 | Mo et al. |
| 2008/0183955 A1 | 7/2008 | Yang et al. |
| 2008/0195801 A1 | 8/2008 | Cheon et al. |
| 2008/0256287 A1 | 10/2008 | Lee et al. |
| 2008/0256295 A1 | 10/2008 | Lambert et al. |
| 2008/0270680 A1 | 10/2008 | Chang |
| 2008/0307192 A1 | 12/2008 | Sinclair et al. |
| 2009/0019218 A1 | 1/2009 | Sinclair et al. |
| 2009/0043985 A1 | 2/2009 | Tuuk et al. |
| 2009/0055620 A1 | 2/2009 | Feldman et al. |
| 2009/0063548 A1 | 3/2009 | Rusher et al. |
| 2009/0119353 A1 | 5/2009 | Oh et al. |
| 2009/0150599 A1 | 6/2009 | Bennett |
| 2009/0154254 A1 | 6/2009 | Wong et al. |
| 2009/0164535 A1 | 6/2009 | Gandhi et al. |
| 2009/0164696 A1 | 6/2009 | Allen et al. |
| 2009/0187732 A1 | 7/2009 | Greiner et al. |
| 2009/0193184 A1 | 7/2009 | Yu et al. |
| 2009/0198952 A1 | 8/2009 | Khmelnitsky et al. |
| 2009/0204750 A1 | 8/2009 | Estakhri et al. |
| 2009/0222643 A1 | 9/2009 | Chu |
| 2009/0240873 A1 | 9/2009 | Yu et al. |
| 2009/0276604 A1 | 11/2009 | Baird et al. |
| 2010/0011275 A1 | 1/2010 | Yang |
| 2010/0061150 A1 | 3/2010 | Wu et al. |
| 2010/0161881 A1 | 6/2010 | Nagadomi et al. |
| 2010/0169543 A1 | 7/2010 | Edgington et al. |
| 2010/0169551 A1 | 7/2010 | Yano et al. |
| 2010/0208385 A1 | 8/2010 | Toukairin |

OTHER PUBLICATIONS

Rosenblum, "The Design and Implementation of a Log-structured File System", EECS Department, University of California, Berkeley, Technical Report No. UCB/CSD-92-696, Jun. 1992.

Amer, et al., "Design Issues for a Shingled Write Disk System", 26th IEEE Symposium on Massive Storage Systems and Technologies: Research Track (MSST 2010), May 2010, 12 pages.

RUN-LENGTH MAPPING TABLE

| RUN-LENGTH MAPPING ENTRY 1 |
| RUN-LENGTH MAPPING ENTRY 2 |
| RUN-LENGTH MAPPING ENTRY 3 |
| RUN-LENGTH MAPPING ENTRY 4 |
| ⋮ |
| RUN-LENGTH MAPPING ENTRY N |

FIG. 3A

RUN-LENGTH MAPPING TABLE ENTRY

| START LBA | RUN-LENGTH | START PBA |
|---|---|---|
| | | BLOCK# · PAGE OFFSET |

FIG. 3B

SINGLE ADDRESS MAPPING TABLE

| SINGLE ADDR MAPPING ENTRY 1 |
| SINGLE ADDR MAPPING ENTRY 2 |
| SINGLE ADDR MAPPING ENTRY 3 |
| SINGLE ADDR MAPPING ENTRY 4 |
| ⋮ |
| SINGLE ADDR MAPPING ENTRY N |

FIG. 3C

SINGLE ADDRESS MAPPING TABLE ENTRY

| LBA | PBA |
|---|---|
| | BLOCK# · PAGE OFFSET |

FIG. 3D

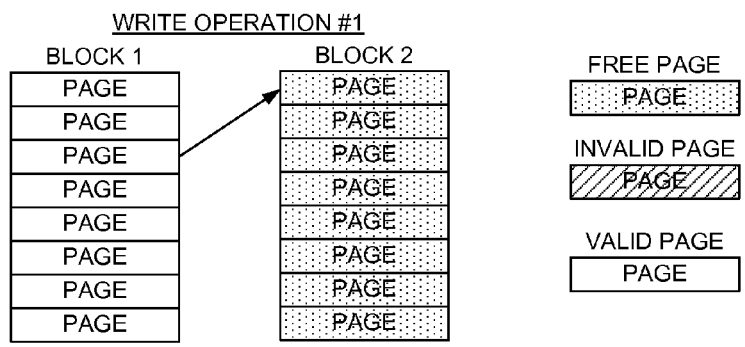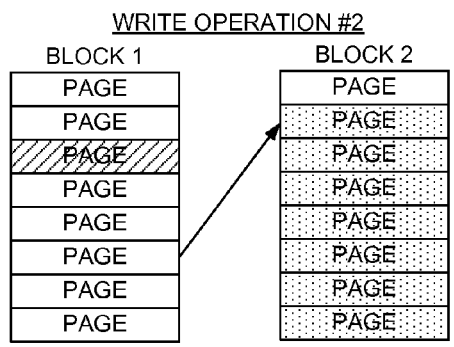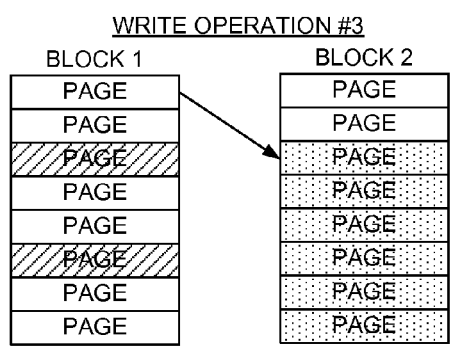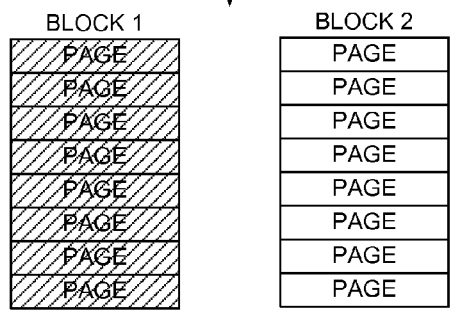

DATA STORAGE DEVICE EMPLOYING A RUN-LENGTH MAPPING TABLE AND A SINGLE ADDRESS MAPPING TABLE

BACKGROUND

Data storage devices (e.g., disk drives or non-volatile semiconductor memories) may be employed as mass storage for a computer system (e.g., desktop, laptop, portable, etc.) or a consumer device (e.g., music player, cell phone, camera, etc.) or other suitable application. The data storage device includes a non-volatile memory (e.g., a disk or a semiconductor memory) for storing user data in blocks which are accessed using an address translation layer. For example, the address translation layer may map a logical block address (LBA) received from a host to a physical block address (PBA) representing a segment of the non-volatile memory. The indirect mapping of LBA to PBA facilitates aspects such as defect mapping, and log-structured file systems where the LBA to PBA mapping may change over time.

An example data storage device employing an address translation layer is a non-volatile semiconductor memory comprising one or more memory devices (such as a flash memory). Each memory device typically comprises a number of blocks which are accessed a page at a time. For example, a single block may comprise 128 pages where each page comprises 4096 bytes. Since a page typically cannot be overwritten without first being erased, a new page in a different block is typically selected to perform an "overwrite" operation. Accordingly, the address translation layer must maintain the appropriate LBA to PBA mapping as each write operation changes the physical location of the user data (similar to a log-structured file system).

When a data storage device is powered on, it typically loads a LBA to PBA mapping table from the non-volatile memory into a volatile memory (DRAM or SRAM) for on-the-fly mapping of LBAs to PBAs when performing access operations. It is desirable to minimize the size of the mapping table in order to reduce the size (and cost) of the volatile memory needed to store the mapping table.

BRIEF DESCRIPTION OF THE DRAWINGS

FIG. 3A shows an example RLMT comprising a number of entries according to an embodiment of the present invention.

FIG. 3B shows an example entry in the RLMT according to an embodiment of the present invention.

FIG. 3C shows an example single address mapping table (SAMT) comprising a number of entries according to an embodiment of the present invention.

FIG. 3D shows an example entry in the SAMT according to an embodiment of the present invention.

FIGS. 4A-4D illustrate an embodiment of the present invention wherein the memory segments are accessed using a paged based mapping scheme.

DETAILED DESCRIPTION OF EMBODIMENTS OF THE INVENTION

Figure 1A:
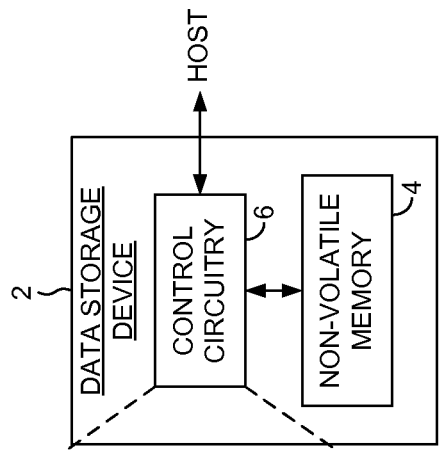
FIG. 1A shows a data storage device comprising a non-volatile memory and control circuitry.
Figure 1B:
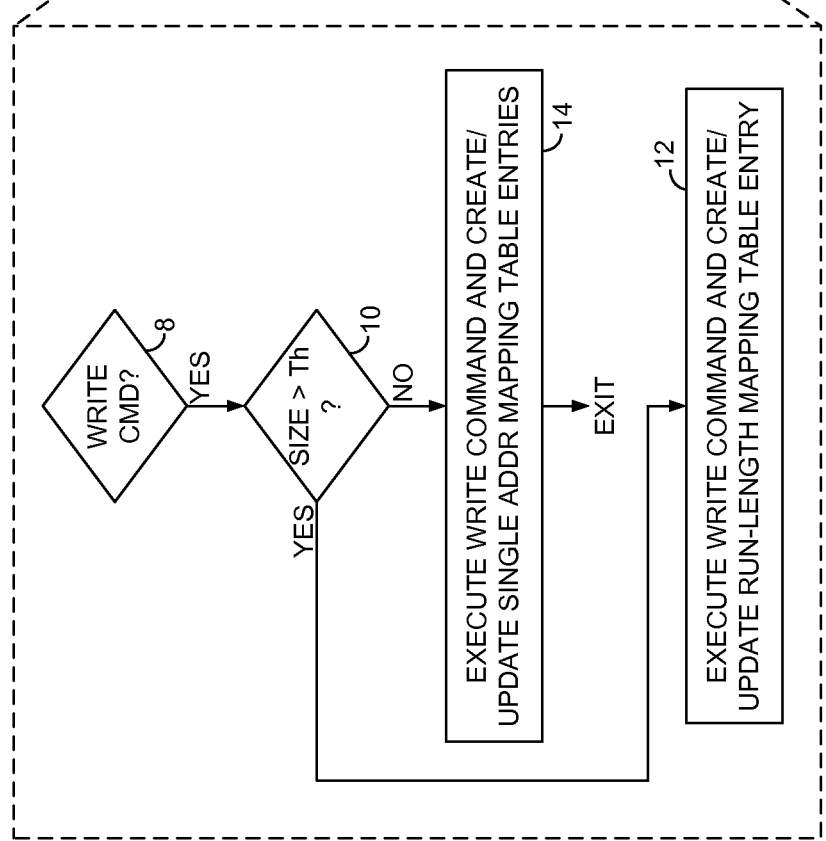
FIG. 1B is a flow diagram executed by the control circuitry according to an embodiment of the present invention wherein when a write command is received to write to a number of consecutive memory segments, a new run-length mapping entry in a run-length mapping table (RLMT) is created.

FIG. 1A shows a data storage device 2 according to an embodiment of the present invention comprising a non-volatile memory 4 having a plurality of memory segments, and control circuitry 6 for executing the flow diagram of FIG. 1B. When a write command comprising a logical block address (LBA) is received (step 8), a number of consecutive memory segments to access in response to the write command is determined. When the number of consecutive memory segments to access is greater than a threshold (step 10), a new run-length mapping entry in a run-length mapping table (RLMT) is created (step 12). When the number of memory segments to access is not greater than a threshold, at least one new single address mapping entry in a single address mapping table (SAMT) is created (step 14).

The RLMT and the SAMT are used to map the LBA received in an access command (write/read) to physical block addresses (PBAs). Each PBA is mapped to one of the memory segments in the non-volatile memory 4, wherein the LBA to PBA mapping facilitates mapping out of defective memory segments as well as a log-structured file system (or derivative thereof) such as in a flash memory device or a disk drive implementing shingled tracks.

Figure 2:
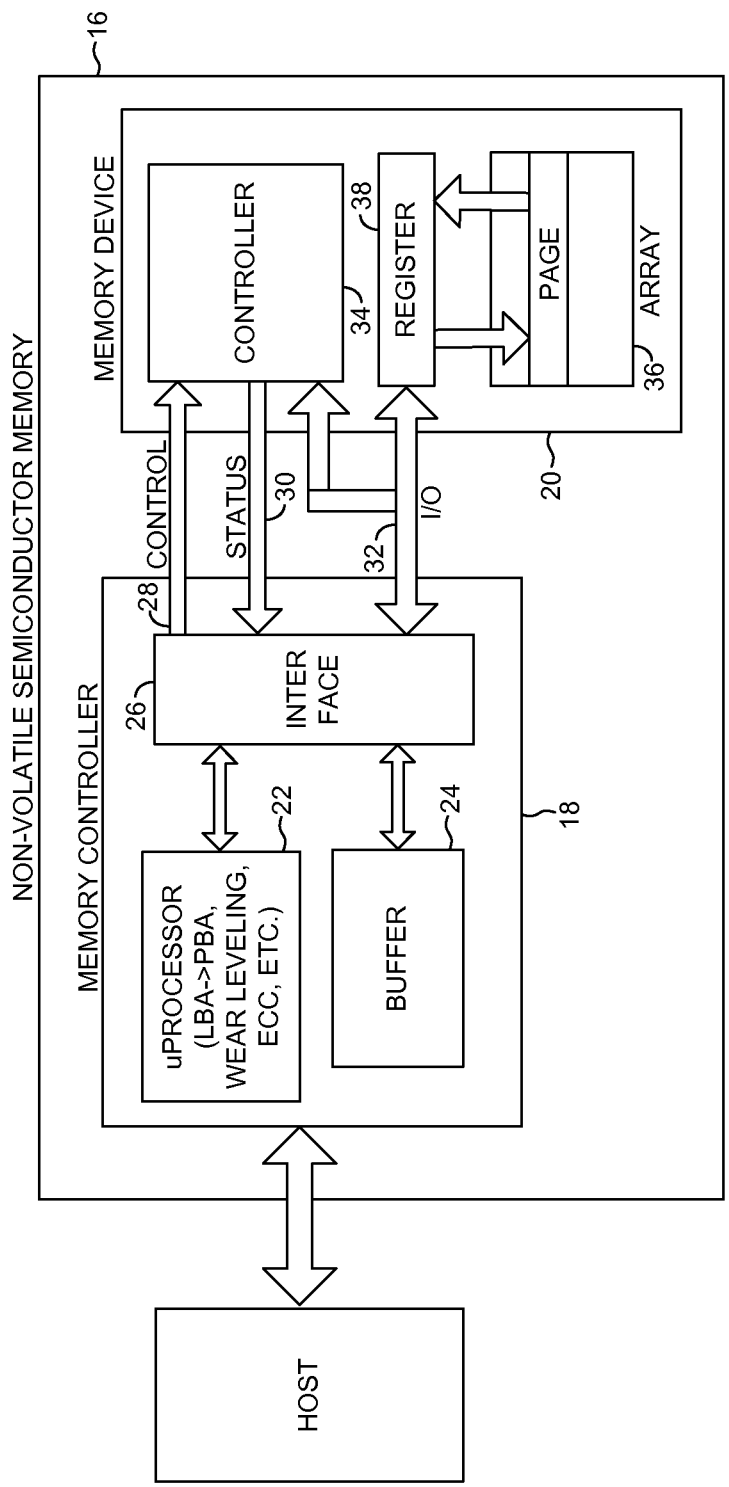
FIG. 2 shows a data storage device in the form of a non-volatile semiconductor memory according to an embodiment of the present invention.

FIG. 2 shows a data storage device in the form of a non-volatile semiconductor memory 16 comprising a memory controller 18 (e.g., a flash memory controller) and a memory device 20 (e.g., a flash memory). The memory controller 18 comprises a microprocessor 22 for implementing various algorithms, including LBA to PBA mapping, wear leveling, error correction code (etc.). The memory controller 18 further comprises a buffer 24 for buffering write/read data, and an interface circuit 26 for interfacing with one or more memory devices 20. The interface circuitry 26 generates suitable control signals 28 and receives status information 30 from the memory device 20 in connection with executing write/read commands initiated by the microprocessor 22. The interface circuitry 26 also transmits and receives data over an I/O bus 32, including write/read data stored in the buffer 24 or command data generated by the microprocessor 22 and transmitted to a controller 34 integrated with the memory device 20.

The memory device 20 comprises an array of memory cells 36 that are accessed in memory segments referred to as pages. During a write operation, write data received over the I/O bus 32 from the buffer 24 is first stored in a data register 38. The controller 34 then transfers the write data from the data register 38 to a target page in the memory array 36. During a read operation, a page in the memory array 36 is read into the data register 38 and then transferred over the I/O bus 32 where it is stored in the buffer 24. In one embodiment, the memory array 36 comprises a plurality of blocks, each block comprises a plurality of pages, and the pages in a block are erased together by erasing the block.

FIG. 3A shows a RLMT according to an embodiment of the present invention comprising a plurality of entries. In one embodiment, a new entry is created in the RLMT when a write command is received from the host to write to a number of consecutive memory segments that is greater than a threshold. FIG. 3B shows an example entry in the RLMT comprising a starting LBA, a run length identifying the number of consecutive memory segments, and a starting PBA corresponding to the first memory segment. In the embodiment shown in FIG. 3B, the starting PBA may be identified by a block number and a page offset within the block. In another embodiment, the starting PBA may further include an offset within a page. In the latter embodiment, each memory segment may correspond to a part of a page. For example, in an embodiment where the non-volatile semiconductor memory emulates a disk drive, a 4096 byte page may comprise eight 512 byte memory segments (data sectors).

When the number of consecutive memory segments identified in a write command is not greater than a threshold, at least one new entry is created in the SAMT an embodiment of which is shown in FIG. 3C. Each entry in the SAMT may comprise an LBA and a corresponding PBA which may include a block number and page offset within the block as shown in FIG. 3D. In the embodiment wherein a PBA may identify a part of a page, the PBA may further include an offset within a page. If the write command identifies more than one consecutive memory segment but still less than the threshold, multiple entries are created in the SAMT. For example, if a write command identifies two consecutive memory segments and the threshold is two, then two new entries in the SAMT are created each comprising an LBA and corresponding PBA.

Any suitable threshold may be used to determine whether to create a single entry in the RLMT or multiple entries in the SAMT. In one embodiment, the threshold is selected to minimize the size of both tables. Referring to the embodiments of FIGS. 3B and 3D, an RLMT entry is larger than an SAMT entry because it includes a field for storing the run length. Therefore, in one embodiment it may require less memory to store multiple SAMT entries as compared to the memory required to store a single RLMT entry. In one embodiment, the threshold for determining whether to create a new RLMT entry may be adapted over time. For example, the threshold may be increased if too many RLMT entries are being created, or the threshold may be decreased if too many SAMT entries are being created.

In one embodiment, the microprocessor 22 of the memory controller 18 processes the entries in the RLMT to implement page based mapping of the pages in the memory array 24. FIGS. 4A-4D illustrate a paged based mapping scheme according to an embodiment of the present invention. With page based mapping, a page within a first block may be overwritten by writing to a new page of a second block without moving the remaining pages from the first block. This is illustrated in FIG. 4A wherein the third page of a first block is overwritten by writing the new data to a first page of a second block. As shown in FIG. 4B, the third page of the first block is flagged as invalid whereas the remaining pages are unchanged. FIG. 4B also illustrates another overwrite command of the sixth page in the first block to the second page of the second block. This process may be repeated over time until all of the pages of the first block are overwritten by writing the new write data to the pages of the second block as illustrated in FIG. 4D. Once all of the pages in the first block have been overwritten and flagged as invalid, the first block can be erased in order to re-allocate the first block. In an alternative embodiment, a garbage collection procedure may move valid pages remaining in the first block to the second block so that the first block can be erased and re-allocated. In one embodiment, an entry in the RLMT may identify a run length of pages that is less than a full block of pages. In other embodiments, a run length of pages may span multiple blocks (e.g., an integer or fractional number of blocks).

Figure 5A:
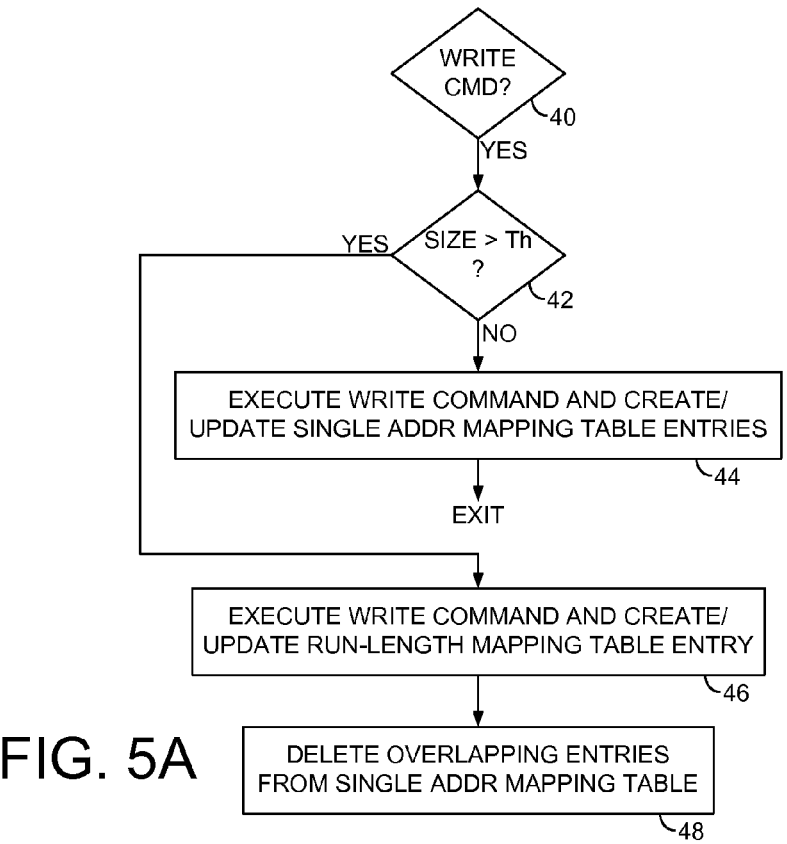
FIG. 5A is a flow diagram according to an embodiment of the present invention wherein when a RLMT entry is created or updated in response to a write command, and overlapping entries in the SAMT are deleted.

FIG. 5A is a flow diagram according to an embodiment of the present invention wherein when a write command is received (step 40) and the number of consecutive memory segments to access is not greater than a threshold (step 42), a SAMT entry is created (step 44). If the write command performs an overwrite of an existing PBA, the corresponding entry in the SAMT is updated with the new PBA. If the number of consecutive memory segments is greater than the threshold (step 42), a RLMT entry is created (step 46). If the write command performs an overwrite of one or more existing PBAs, one or more corresponding entries in the RLMT are updated (e.g., truncated or extended). In one embodiment, if a new or updated RLMT entry overlaps one or more entries in the SAMT, the corresponding overlapping entries are deleted from the SAMT (step 48). The order of writing the data and updating the tables may be reversed so that the tables are updated prior to executing the write command.

Figure 5B:
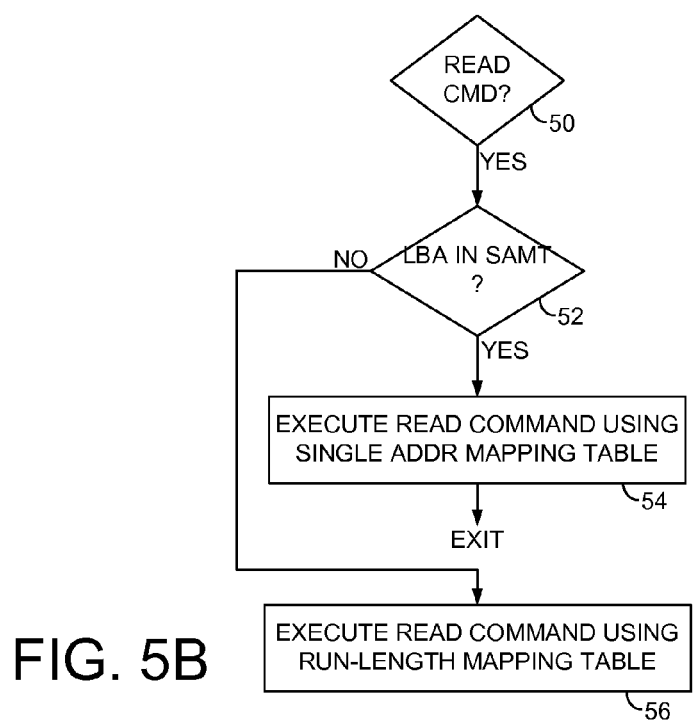
FIG. 5B is a flow diagram according to an embodiment of the present invention wherein when a read command is received, the LBA to PBA mapping first searches the SAMT and then the RLMT.

In one embodiment, a new entry created in the SAMT may overlap an entry in the RLMT. Rather than update the RLMT (e.g., by splitting an entry), the microprocessor 22 gives priority to the SAMT. This embodiment is illustrated in the flow diagram of FIG. 5B wherein when a read command is received (step 50) the LBA in the read command is first compared to the entries in the SAMT (step 52). If the LBA is in the SAMT, the read command is executed using the SAMT (step 54). Otherwise, the read command is executed using the RLMT (step 56). In one embodiment, some of the LBAs of a read command may be located in the SAMT, with the remaining LBAs located in the RLMT (any overlapping entries located in both the SAMT and RLMT are taken from the SAMT).

Figure 6A:
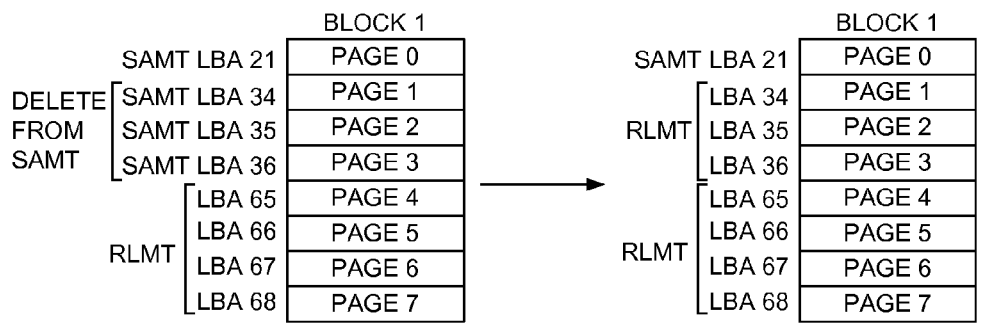
FIG. 6A illustrates an embodiment of the present invention wherein entries in the SAMT are periodically coalesced into the RLMT and the corresponding entries in the SAMT deleted.
Figure 6B:
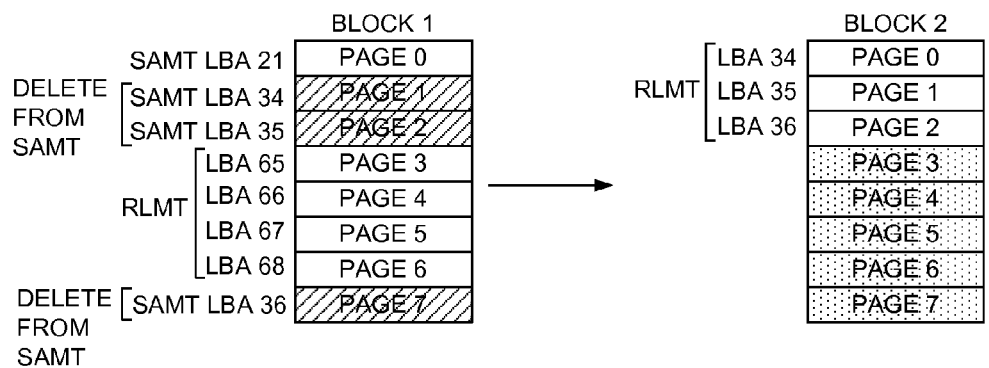
FIG. 6B illustrates an embodiment of the present invention wherein the coalescing of the SAMT entries into the RLMT occurs during a write operation.
Figure 6C:
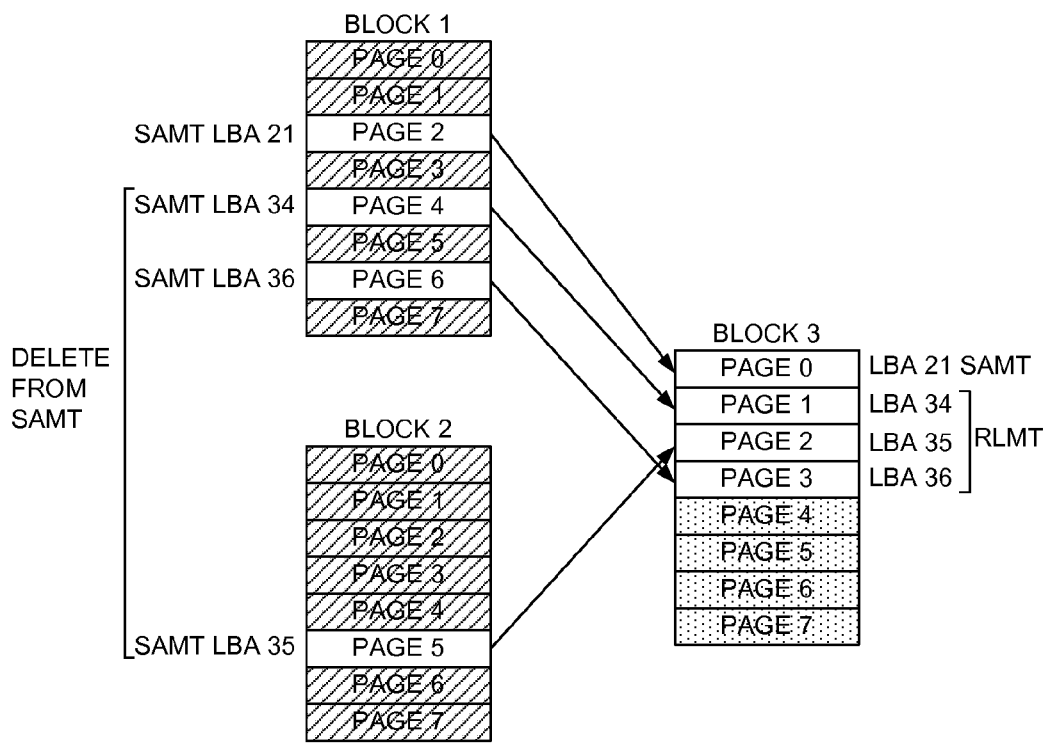
FIG. 6C illustrates an embodiment of the present invention wherein the coalescing of the SAMT entries into the RLMT occurs during a garbage collection procedure.

In one embodiment, a plurality of entries in the SAMT may be coalesced into one or more entries in the RLMT thereby reducing the size of the SAMT. FIG. 6A shows an example where LBAs 34-36 were written by executing three separate single segment write commands resulting in three SAMT entries. During a background scan, the control circuitry may identify and coalesce the three consecutive SAMT entries into a single RLMT entry as illustrated in FIG. 6A (the three SAMT entries are deleted). FIG. 6B shows an example where LBAs 34-36 were initially written to three non-consecutive pages resulting in three SAMT entries. During a subsequent write operation, the three LBAs are written to three consecutive pages, and therefore the three SAMT entries are coalesced into a single RLMT entry as illustrated in FIG. 6B (the three SAMT entries are deleted). FIG. 6C shows an example wherein LBAs 34-36 were written to three non-consecutive pages of two blocks resulting in three SAMT entries. During a garbage collection procedure, the three LBAs are relocated to three consecutive pages of a third block and the three SAMT entries coalesced into a single RLMT entry as illustrated in FIG. 6C (the three SAMT entries are deleted).

Figure 7A:
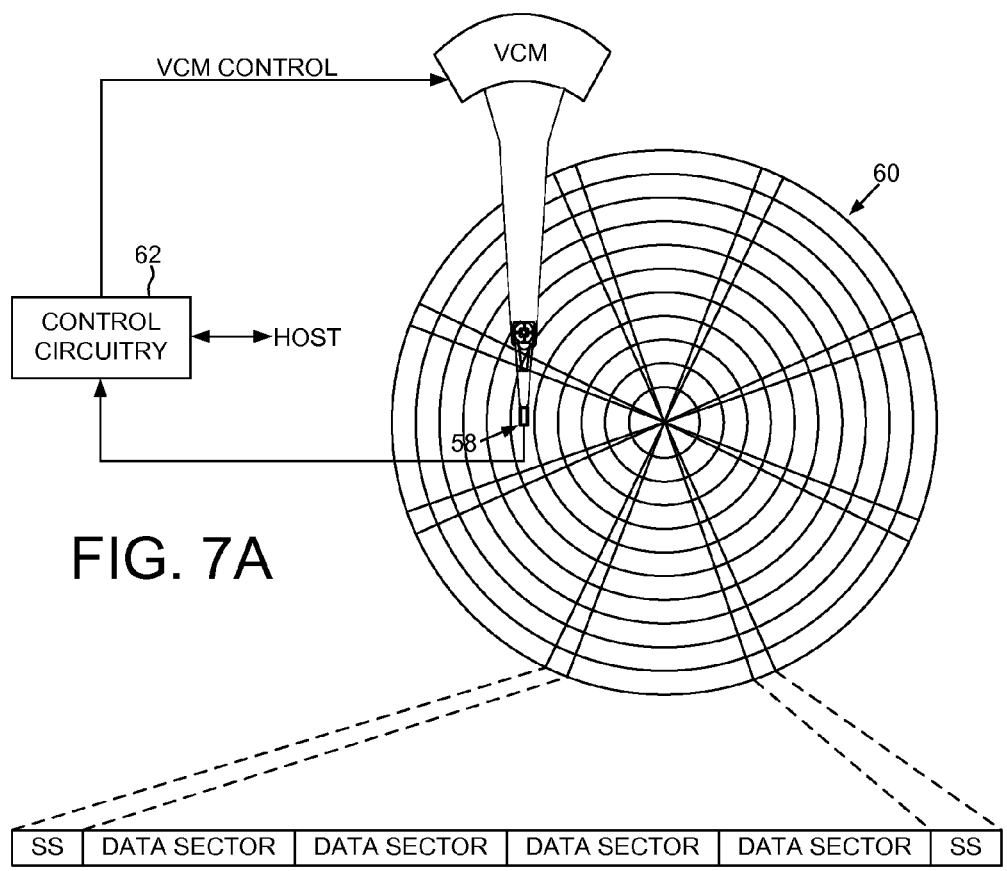
FIG. 7A shows a data storage device in the form of a disk drive according to an embodiment of the present invention.
Figure 7B:
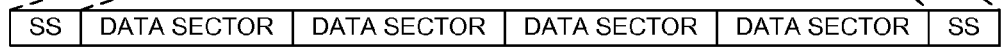
FIG. 7B shows an embodiment of the present invention wherein each memory segment corresponds to a data sector in a data track.

FIG. 7A shows a data storage system in the form of a disk drive comprising a head 58 actuated over a disk 60 by a voice coil motor (VCM). The disk drive further comprises control circuitry 62 for implementing at least one of the LBA to PBA mapping techniques described above. The disk comprises a plurality of data tracks, wherein in an example shown in FIG. 7B each data track comprises a plurality of data sectors for storing user data and embedded servo sectors (SS) for storing servo positioning information (e.g., track address and servo bursts). In one embodiment, each memory segment corresponds to a data sector accessed through a PBA. Similar to a flash based memory device described above, the disk drive of FIG. 7A may implement a dynamic LBA to PBA mapping, for example, when implementing a log-structured file system. With a log-structured file system, data is typically written to a new memory segment (e.g., data sector) during each write operation (including overwrite operations). The old memory segments (e.g., data sectors) are invalidated and then reallocated using a garbage collection algorithm. A disk drive may implement a log-structured file system, for example, when implementing a shingled track system where write operations progress in the same radial direction so that the data tracks can overlap, thereby increasing the tracks per inch (TPI). Since write operations progress in the same radial direction (e.g., from the OD to ID), an LBA previously assigned to an old PBA is relocated to a new PBA at the "head" of the write log when executing an overwrite operation. The SAMT and RLMT embodiments described above help facilitate this dynamic relocation of LBAs during write operations, thereby reducing the memory required to implement LBA to PBA mapping.

Any suitable control circuitry may be employed to implement the flow diagrams in the embodiments of the present invention, such as any suitable integrated circuit or circuits. For example, the control circuitry may be implemented within a flash memory controller and/or memory device controller as illustrated in FIG. 2. In the embodiment shown in FIG. 7A, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any suitable computer-readable medium. In one embodiment, they may be stored on a non-volatile semiconductor memory external to the microprocessor, or integrated with the microprocessor in a SOC. In another embodiment, the instructions are stored on a disk and read into a volatile semiconductor memory when the disk drive is powered on. In yet another embodiment, the control circuitry comprises suitable logic circuitry, such as state machine circuitry.

What is claimed is:

1. A data storage device comprising:
   a non-volatile memory comprising a plurality of memory segments; and
   control circuitry operable to:
      receive a write command comprising a logical block address (LBA);
      determine a number of consecutive memory segments to access in response to the write command;
      when the number of consecutive memory segments to access is greater than a threshold of more than one memory segment, create a new run-length mapping entry in a run-length mapping table (RLMT); and
      when the number of consecutive memory segments to access is not greater than the threshold, create at least two new single address mapping entries in a single address mapping table (SAMT).

2. The data storage device as recited in claim 1, wherein when the number of consecutive memory segments to access is greater than the threshold, the control circuitry is further operable to:
   perform the write command;
   determine a number of entries in the SAMT that overlap with the new entry in the RLMT; and
   delete the overlapping entries from the SAMT.

3. The data storage device as recited in claim 1, the control circuitry is further operable to:
   receive a read command comprising a read LBA
   first determine whether the read LBA maps to an entry in the SAMT; and
   when the read LBA does not map into the SAMT, use the RLMT to execute the read command.

4. The data storage device as recited in claim 1, wherein:
   the non-volatile memory comprises a semiconductor memory array;
   the semiconductor memory array comprises a plurality of blocks;
   each block comprises a plurality of pages; and
   each memory segment corresponds to one of the pages.

5. The data storage device as recited in claim 4, wherein each memory segment corresponds to a part of a page.

6. The data storage device as recited in claim 4, wherein the control circuitry processes the entries in the RLMT to implement page based mapping of the pages in the semiconductor memory array.

7. The data storage device as recited in claim 4, wherein the single address mapping entry comprises a block number identifying a target block and a page offset within the target block.

8. The data storage device as recited in claim 4, wherein the run-length mapping entry comprises a block number identifying a target block, a page offset within the target block, and a number of consecutive pages corresponding to the run-length.

9. The data storage device as recited in claim 1, wherein the control circuitry is further operable to:
   coalesce entries in the SAMT into the RLMT; and
   delete the coalesced entries from the SAMT.

10. The data storage device as recited in claim 9, wherein the control circuitry is further operable to coalesce entries in the SAMT into the RLMT in response to a write operation.

11. The data storage device as recited in claim 9, wherein the control circuitry is further operable to coalesce entries in the SAMT into the RLMT in response to a garbage collection operation.

12. The data storage device as recited in claim 1, wherein:
   the non-volatile memory comprises a disk;
   the disk comprises a plurality of tracks;
   each track comprises a plurality of data sectors; and
   each memory segment corresponds to one of the data sectors.

13. A method of operating a data storage device comprising a non-volatile memory comprising a plurality of memory segments, the method comprising:
- receiving a write command comprising a logical block address (LBA);
- determining a number of consecutive memory segments to access in response to the write command;
- when the number of consecutive memory segments to access is greater than a threshold of more than one memory segment, creating a new run-length mapping entry in a run-length mapping table (RLMT); and
- when the number of consecutive memory segments to access is not greater than the threshold, creating at least two new single address mapping entries in a single address mapping table (SAMT).

14. The method as recited in claim 13, wherein when the number of consecutive memory segments to access is greater than the threshold, further comprising:
- performing the write command;
- determining a number of entries in the SAMT that overlap with the new entry in the RLMT; and
- deleting the overlapping entries from the SAMT.

15. The method as recited in claim 13, further comprising:
- receiving a read command comprising a read LBA;
- first determining whether the read LBA maps to an entry in the SAMT; and
- when the read LBA does not map into the SAMT, using the RLMT to execute the read command.

16. The method as recited in claim 13, wherein:
- the non-volatile memory comprises a semiconductor memory array;
- the semiconductor memory array comprises a plurality of blocks;
- each block comprises a plurality of pages; and
- each memory segment corresponds to one of the pages.

17. The method as recited in claim 16, wherein each memory segment corresponds to a part of a page.

18. The method as recited in claim 16, further comprising processing the entries in the RLMT to implement page based mapping of the pages in the semiconductor memory array.

19. The method as recited in claim 16, wherein the single address mapping entry comprises a block number identifying a target block and a page offset within the target block.

20. The method as recited in claim 16, wherein the run-length mapping entry comprises a block number identifying a target block, a page offset within the target block, and a number of consecutive pages corresponding to the run-length.

21. The method as recited in claim 13, further comprising:
- coalescing entries in the SAMT into the RLMT; and
- deleting the coalesced entries from the SAMT.

22. The method as recited in claim 21, further comprising coalescing entries in the SAMT into the RLMT in response to a write operation.

23. The method as recited in claim 21, further comprising coalescing entries in the SAMT into the RLMT in response to a garbage collection operation.

24. The method as recited in claim 13, wherein:
- the non-volatile memory comprises a disk;
- the disk comprises a plurality of tracks;
- each track comprises a plurality of data sectors; and
- each memory segment corresponds to one of the data sectors.

* * * * *